United States Patent [19]

Hesse

[11] 4,152,081

[45] May 1, 1979

[54] COLD MILLING RUBBER GRANULATE IN A PINNED DISK MILL

[75] Inventor: Jürgen Hesse, Düsseldorf, Fed. Rep. of Germany

[73] Assignee: Messer Griesheim GmbH, Frankfurt am Main, Fed. Rep. of Germany

[21] Appl. No.: 885,906

[22] Filed: Mar. 13, 1978

[30] Foreign Application Priority Data

Mar. 29, 1977 [DE] Fed. Rep. of Germany ....... 2713809

[51] Int. Cl.² .............................................. B01F 7/10
[52] U.S. Cl. ..................................... 366/317; 366/304
[58] Field of Search ................ 366/292, 303, 304, 317

[56] References Cited

U.S. PATENT DOCUMENTS

| | | | |
|---|---|---|---|
| 2,639,901 | 5/1953 | Teale | 366/317 |
| 2,641,453 | 6/1953 | Teale | 366/303 |
| 2,904,407 | 9/1959 | Rosenthal | 366/317 |
| 3,251,577 | 5/1966 | Bolanowski | 366/304 |

Primary Examiner—Edward J. McCarthy
Attorney, Agent, or Firm—Connolly and Hutz

[57] ABSTRACT

Rubber granulate is cold milled in a pinned disk mill having a fast moving disk and a slow moving disk with the number of pins in at least the outer row of the fast moving disk being half the number of pins in the corresponding rows of pins of the slow moving disk.

6 Claims, 3 Drawing Figures

COLD MILLING RUBBER GRANULATE IN A PINNED DISK MILL

BACKGROUND OF INVENTION

The invention is concerned with a process and a device for cold milling rubber granulate in a pinned disk mill.

The pinned disk mill is frequently used for the milling of soft to medium hard materials. It consists in principle of two disks with several rows of pins mounted in a concentric circle. One disk plate rotates very fast while the other rotates slowly or is standing still. The particles of the material to be milled bounce with a high velocity onto the pins and are thereby reduced in size.

The fine milling of rubber granulate in studded or toothed disk mills is well known. Since rubber is very soft at room temperature, it is therefore necessary, when fine milling in other mills, to embrittle the rubber granulate before or, if necessary, during the milling process. This is done by cooling, for example, with liquid nitrogen. It has been demonstrated thereby that the specific nitrogen consumption, e.g. the nitrogen consumed per kg. of rubber granulate, is relatively high. There results additionally, a considerable amount of wear of the miling parts because the embrittled rubber granulate is quite abrasive. Furthermore, as for example, with pinned disk mills, the throughput capacities attainable for rubber granulate are small compared to that for other materials.

SUMMARY OF INVENTION

The object of the invention is to achieve a process for cold milling rubber granulate in a pinned disk mill which, compared to previous practice, requires an essentially smaller specific cooling medium consumption, particularly nitrogen consumption, with which the wear of the pins is reduced and whereby the throughput capacity is, at the same time, increased with approximately the same fitness and the same granulate spectrum.

This is achieved, according to the invention, because the milling process occurs in a pinned disk mill in which the number of pins in at least the outer row of pins of the fast moving pin disk is half as great as the number of pins in the correspoding rows of the slow moving pin disk.

One preferably proceeds so that the fast moving pin disk moves at 8,000 to 10,500 RPM and the slow moving pin disk at 3,500 to 5,000 RPM. The rubber granulate is preferably cooled to temperatures between $-60°$ C. and $-150°$ C. The cooling should be so powerful that the mill temperature is about $10°$ C. lower than the temperature which has proven adequate with the previously used procedure using the full amount of pins. In practice, this means that the temperature of the gas circulating in the mill must, for example, be lowered from $-40°$ C. to $-50°$ C.

In a pinned disk mill for the practice of the inventive process, the number of pins in at least the outer row of pins of the fast moving pin disk is half as great as the number of pins in the corresponding rows of the slow moving pin disk. As is frequently used today, it is sufficient if each pin disk is provided with three rows of pins.

Surprisingly, as a result of the inventive practice, namely, to reduce the number of pins in the fast moving pin disk to half, a considerable improvement in the cold milling of rubber granulate is achieved. For example, when milling granulate from old tires with a granule size of between 1 and 4 mm which was embrittled with liquid nitrogen and which has to be milled so fine that at least 90% of the granules are smaller than 0.5 mm, the following improvement could be achieved:

The throughput was increased from 230kg/h to 363kg/h. The specific nitrogen consumption was thereby reduced from 1.47 kg $N_2$/kg of product to 0.94 kg $N_2$/kg of product. The wear of the pins was reduced to half. The service life, especially of the pins of the outer row of the fast moving disk which were the most subject to wear, was increased by 60%. The wear of the inner rows of pins was smaller and related to that of the outer row in the ratio 0.4:0.9:1.

THE DRAWINGS

DETAILED DESCRIPTION

Figure 1:
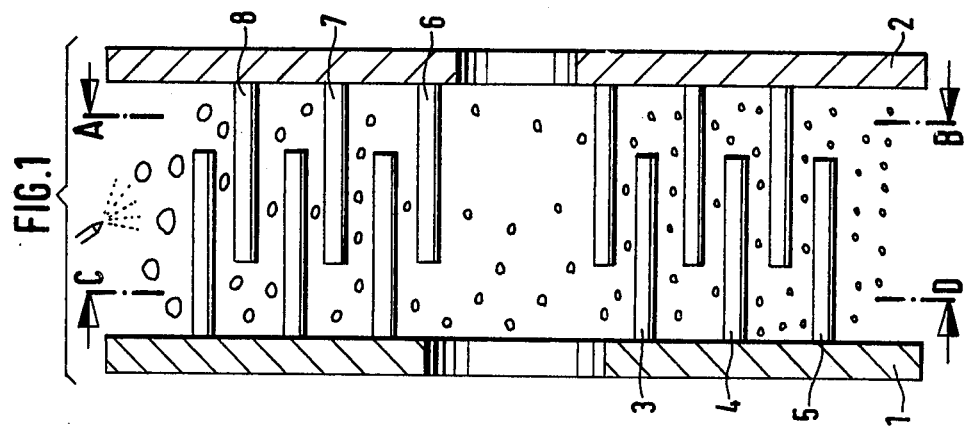
FIG. 1 illustrates a longitudinal section of the pin disks of the mill in accordance with this invention.

Of the entire pinned disk mill, only the doorside pin disk 1 and the housingside pin disk 2 have been illustrated in FIG. 1 for the sake of simplicity. On the doorside pin disk 1 are the rows of 3, 4, 5 and correspondingly on the housing-disk pin disk 2 are the rows of pins 6, 7 and 8.

Figure 3:
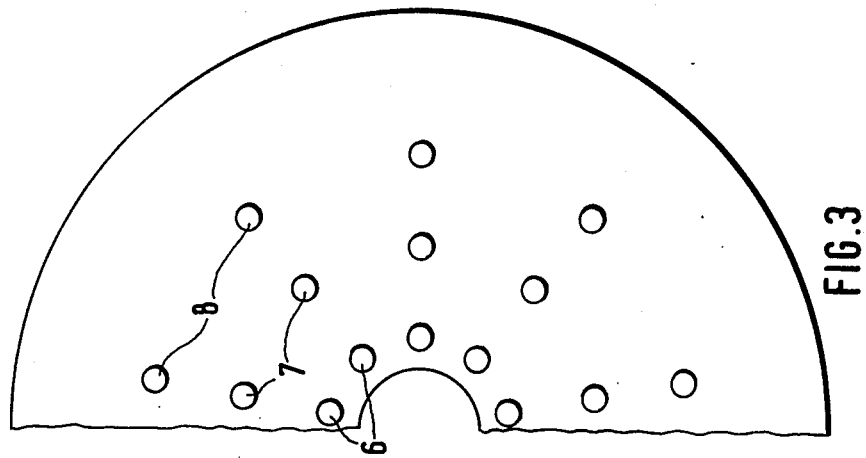
FIG. 3 is a view according to the section C-D in FIG. 1.
Figure 2:
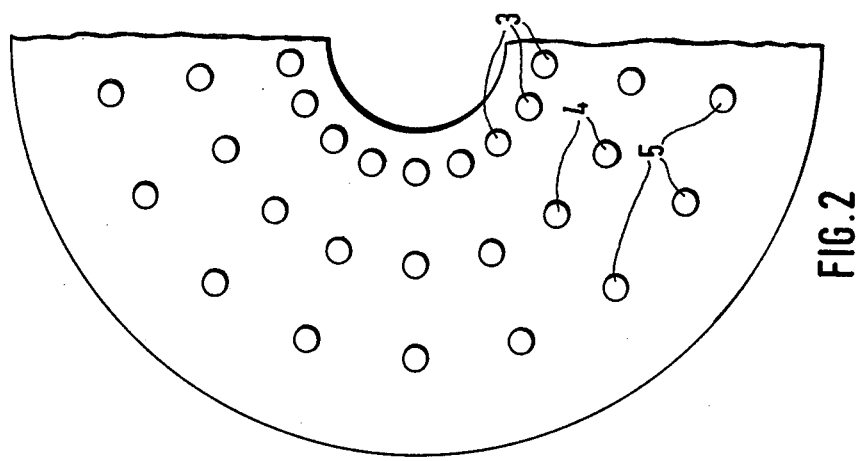
FIG. 2 is a view according to the section A-B in FIG. 1.

The rows of pins 3 to 8 consist of individual pins as is evident from FIGS. 2 and 3. While the doorside pin disk 1 illustrated in FIG. 2 corresponds to the state of the art, the housingside pin disk 2 illustrated in FIG. 3 has only half as many pins in each row as does the doorside pin disk 1. It is assumed here that the housingside pin disk 2 is the fast moving pin disk.

The inventive process is primarily suited for cold milling rubbber, e.g. mixtures of synthetic and natural rubber. The pure components including whatever additive materials can also be milled. All other cold millable materials can be reduced in size with the inventive process inasmuch as no altogehter great milling fineness (100%<200μ) is required.

FIG. 1 schematically illustrates rubber granulate being cooled by, for example, nitrogen schematically illustrated as being discharged from a nozzle.

What is claimed is:

1. In a process for cold milling rubber granulate in a pinned disk mill having a slow moving disk and a fast moving disk, the improvement being that the milling process occurs in a pinned disk mill in which the number of pins in at least the outer row of pins of the fast moving pin disk is half as great as the number of pins in the corresponding rows of pins of the slow moving pin disk.

2. Process according to claim 1, characterized therein that the fast moving pin disk rotates at 8,000 to 10,500 RPM and that the slow moving pin disk rotates at 3,500 to 5,000 RPM.

3. Process according to claim 2, characterized therein that the rubber granulate is cooled to temperatures between $-40°$ and $-150°$ C.

4. Process according to claim 1, characterized therein that the rubber granulate is cooled to temperatures between $-40°$ and $-150°$ C.

5. In a pinned disk mill for cold milling rubber granulate by means of a fast moving disk and a slow moving disk, the improvement being that the number of pins in at least the outer row of pins of said fast moving pin disk is half as great as the number of pins in the corresponding rows of pins of said slow moving pin disk.

6. In the disk mill according to claim 5, characterized therein that each of said disks include the number of rows of pins, and each row of said fast moving pin disk having half as great the number of pins as its corresponding in said slow moving pin disk.

* * * * *